United States Patent
Peters et al.

(10) Patent No.: US 11,341,651 B2
(45) Date of Patent: May 24, 2022

(54) METHOD AND APPARATUS FOR REFINING A MODEL OF AN ANATOMICAL STRUCTURE IN AN IMAGE

(71) Applicant: KONINKLIJKE PHILIPS N.V., Eindhoven (NL)

(72) Inventors: Jochen Peters, Norderstedt (DE); Frank Michael Weber, Hamburg (DE); Rolf Jürgen Weese, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 595 days.

(21) Appl. No.: 16/317,901

(22) PCT Filed: Jul. 25, 2017

(86) PCT No.: PCT/EP2017/068772
§ 371 (c)(1),
(2) Date: Jan. 15, 2019

(87) PCT Pub. No.: WO2018/019835
PCT Pub. Date: Feb. 1, 2018

(65) Prior Publication Data
US 2021/0279886 A1    Sep. 9, 2021

(30) Foreign Application Priority Data
Jul. 26, 2016    (EP) .................................. 16181126

(51) Int. Cl.
*G06K 9/00* (2022.01)
*G06T 7/149* (2017.01)
*G06T 7/12* (2017.01)
(52) U.S. Cl.
CPC ............... *G06T 7/149* (2017.01); *G06T 7/12* (2017.01); *G06T 2207/20096* (2013.01); *G06T 2207/30048* (2013.01)

(58) Field of Classification Search
CPC .................................................... G06T 7/149
See application file for complete search history.

(56) References Cited

U.S. PATENT DOCUMENTS 7,693,563 B2    4/2010    Suresh et al.
7,940,974 B2    5/2011    Skinner et al.
(Continued)

FOREIGN PATENT DOCUMENTS

JP    H07255703 A    10/1995

OTHER PUBLICATIONS

Mallya, et al., "Shape constrained mesh editing for delineating anatomical structures in volumetric datasets", Advance Computing Conference, 2010 IEEE 2nd International IEEE, Piscataway, NJ, Feb. 19, 2010, pp. 97-100. (Abstract).
(Continued)

*Primary Examiner* — Oneal R Mistry (57) ABSTRACT

There is provided a method and apparatus for refining a model of an anatomical structure in an image. A model for the anatomical structure in the image is acquired. The model comprises a plurality of control points, each control point corresponding to a feature in the anatomical structure. The model is placed in the image with respect to the anatomical structure. Based on a user input received to adjust the model in the image, a position of at least one of the plurality of control points is adjusted to alter a shape of the model to the anatomical structure in the image, wherein adjustment of the position of one or more of the at least one control points is restricted based on information relating to the at least one control point.

20 Claims, 3 Drawing Sheets

(56) References Cited

U.S. PATENT DOCUMENTS

| | | | |
|---|---|---|---|
| 9,196,049 B2 | 11/2015 | Ionasec et al. | |
| 2008/0267468 A1 | 10/2008 | Geiger et al. | |
| 2010/0286995 A1 | 11/2010 | Pekar et al. | |
| 2013/0251230 A1* | 9/2013 | Lee | G06T 7/12 382/131 |
| 2014/0369576 A1* | 12/2014 | Zheng | G06K 9/6256 382/128 |
| 2015/0049081 A1* | 2/2015 | Coffey | G06T 19/006 345/419 |
| 2016/0005166 A1* | 1/2016 | Xu | G06T 7/12 382/128 |
| 2016/0267690 A1* | 9/2016 | Bai | G06T 7/60 |
| 2017/0193658 A1* | 7/2017 | Cardinal | G06T 7/143 |
| 2019/0239926 A1* | 8/2019 | Pavlovskaia | B33Y 10/00 |

OTHER PUBLICATIONS

Van Ginneken, et al., "Interactive shape models", Progress in Biomedical Optics and Imaging, Spie-International Society for Optical Engineering, Bellingham, WA, US, vol. 5032, Jan. 1, 2003, pp. 1206-1216. (Abstract).

Graser, et al., "A Robust Model-Based Approach to Detect the Mitral Annulus in 3D Ultrasound", Medical Imaging 2013, Proc. of SPIE vol. 8669, Downloaded From: http://reviews.spiedigitallibrary.org, 6 pages.

Timinger, et al., "Integration of Interactive Corrections to Model-Based Segmentation Algorithms", Bildverarbeitung Fur Die Medizin 2003, Springer, DE, Mar. 9, 2003, pp. 171-175. (Abstract).

Barrett et al., "Interactive Live-wire Boundary Extraction", Medical Image Analysis, Oxford University Press, Oxford, GB, vol. 1, No. 4, Jan. 1, 1997, pp. 1-20.

Ecabert, et al. "Automatic model-based segmentation of the heart in CT images." Medical Imaging, IEEE Transactions on Sep. 27, 2008: 1189-1201. (Abstract).

Blanke, et al., "A simplified D-shaped model of the mitral annulus to facilitate CT-based sizing before transcatheter mitral valve implantation", Journal of Cardiovascular CT, vol. 8, 2014, pp. 459-467.

Blanke, et al., "Multimodality Imaging in the Context of Transcatheter Mitral Valve Replacement", JACC, vol. 8, No. 10, 2015, pp. 1191-1208.

Sotaquira, et al., "Nearly-Automated Quantification of Mitral Annulus and Leaflet Morphology from Transesophageal Real-Time 3D Echocardiography", Computing in Cardiology 2012, 39:145-148.

* cited by examiner

METHOD AND APPARATUS FOR REFINING A MODEL OF AN ANATOMICAL STRUCTURE IN AN IMAGE

This application is the U.S. National Phase application under 35 U.S.C. § 371 of International Application No. PCT/EP2017/068772, filed on Jul. 25, 2016, which claims the benefit of European Application Serial No. 16181126.0, filed Jul. 26, 2016. These applications are hereby incorporated by reference herein.

TECHNICAL FIELD OF THE INVENTION

The invention relates to the field of medical imaging and, in particular, relates to refining a model of an anatomical structure in an image.

BACKGROUND TO THE INVENTION

Medical imaging is a useful tool for providing visual representations of anatomical structures (for example, organs) in images. There exist many different types of medical imaging techniques including computed tomography (CT), magnetic resonance (MR), ultrasound (US), and similar. The images acquired from medical imaging can prove valuable for clinical analysis of a subject and, where necessary, medical intervention.

For example, medical imaging is particularly useful in the treatment of mitral valve disease. The treatment of mitral valve disease requires interventional devices and planning systems, which are part of a fast growing market. In planning systems, the mitral valve annulus and the leaflets need to be characterised and certain lengths and areas need to be measured. This is typically achieved through a manual process based on a plurality of reformatted two-dimensional views acquired from a computed tomography (CT) or ultrasound (US) image. For example, a clinical workflow for mitral valve measurements can involve two-dimensional reformats that cut the left ventricle and the mitral valve along the long axis of the left ventricle and present orthogonal cuts through the mitral valve. By rotating these views around the left ventricle long axis, a series of "paddle-wheel" reformats is created. The annulus of the mitral valve can be annotated manually in 16 discrete rotation states of the paddle-wheel series (for example, at angular increments of 22.5 degrees). A three-dimensional contour defining the mitral valve annulus can be estimated by interpolation between the resulting 16 control points. Also, in two of these views, trigone points can be annotated.

As mentioned, these current clinical workflows require manual interaction. However, due to the complex anatomy of the mitral valve and mitral annulus, the current techniques are cumbersome, unintuitive and often not reproducible. Moreover, the mitral valve annulus has a shape that is too complex to simply approximate to a geometric primitive shape (such as an ellipsoidal or a circular structure) that might be edited with few degrees of freedom. In contrast, the shape of the mitral valve annulus introduces many degrees of freedom for editing. In addition, extra annotation has to be performed to define an approximate location of the trigones, which are used to convert the full saddle-shaped annulus into a more D-shaped annulus structure that better fits the geometrical properties needed for device planning. However, due to the complex three-dimensional anatomy of the mitral annulus and mitral valve, annotations in two-dimensional slices are not intuitive and often not reproducible. Also, the 16 two-dimensional views may not be optimal to define the trigone points in three-dimensions.

In order to overcome the issues with manual interaction, there have been provided methods for modelling the mitral annulus. For example, "*A Robust Model-Based Approach to Detect the Mitral Annulus in 3D Ultrasound*", by Bastian Graser et al, Medical Imaging 2013, discloses such a model that is created from three-dimensional ultrasound data where forces are calculated and applied to adjust the model. However, these forces can result in unreliable adjustments being made and an inaccurate model of the mitral annulus being provided.

Even in view of the above difficulties, mitral valve replacement is a rapidly growing discipline in cardiac surgery and thus the complicated geometry of the mitral valve continues to result in complex planning with several measurements being required to plan an optimal device and optimal path for an intervention. The same difficulties also exist in many other anatomical structures having complicated geometries.

Therefore, there is a need for an improved method and apparatus that refines a model of an anatomical structure in an image to overcome the existing problems.

SUMMARY OF THE INVENTION

As noted above, a limitation with existing approaches is that current clinical workflows require manual interaction to plan the treatment of disease in anatomical structures, which can be cumbersome, unintuitive and often not reproducible. Moreover, the complicated geometry of anatomical structures make the planning of an optimal device and an optimal path for an intervention complex, with existing models for the anatomical structures proving to be inaccurate. It would be valuable to have a method and apparatus that can refine a model of the complex anatomical structure to overcome these existing problems.

Therefore, according to a first aspect of the invention, there is provided a method for refining a model of an anatomical structure in an image. The method comprises acquiring a model for the anatomical structure in the image, the model comprising a plurality of control points, each control point corresponding to a feature in the anatomical structure. The method also comprises placing the model in the image with respect to the anatomical structure and, based on a user input received to adjust the model in the image, adjusting a position of at least one of the plurality of control points to alter a shape of the model to the anatomical structure in the image, wherein adjustment of the position of one or more of the at least one control points is restricted based on information relating to the at least one control point.

In some embodiments, adjustment of the position of the at least one control point may cause adjustment of a position of one or more other control points.

In some embodiments, the method may comprise adjusting a position of at least two of the plurality of control points to alter the shape of the model to the anatomical structure in the image, wherein adjustment of the position of one of the at least two control points is restricted independently of one or more other control points.

In some embodiments, the information relating to the at least one control point may comprise anatomical context information comprised in the model relating to the feature to which the at least one control point corresponds. In some embodiments, the anatomical context information may set one or more restrictions on the adjustment to the at least one control point that ensure the shape of the anatomical feature to which the at least one control point corresponds is reflected in the adjusted model.

In some embodiments, the anatomical context information may be encoded in the model. In some embodiments, the one or more restrictions may include a maximum amount by which the at least one control point is adjustable to ensure the shape of the feature to which the at least one control point corresponds is reflected in the adjusted model.

In some embodiments, the anatomical context information may define a manner in which a shape of the feature to which the at least one control point corresponds is constructed from adjusting the at least one control point.

In some embodiments, the information relating to the at least one control point may comprise image context information relating to one or more characteristics of the image at the at least one control point.

In some embodiments, the adjustment of the positon of the at least one control point may be restricted by restricting the degrees of freedom for the adjustment of the position of the at least one control point.

In some embodiments, restricting the degrees of freedom may comprise restricting any one or more of the following: a plane in which the position of the at least one control point is adjustable, a direction in relation to an original position of the at least one control point in which the at least one control point is adjustable, a direction in relation to at least one other control point in which the at least one control point is adjustable, a distance from the original position of the at least one control point by which the at least one control point is adjustable, a distance in relation to at least one other control point by which the at least one control point is adjustable, a region within which the control point is adjustable, and a movement of the at least one control point to a curve or a non-planar plane.

In some embodiments, the method may further comprise extracting geometric information from the image for the anatomical structure and labelling at least one control point with the feature to which the at least one control point corresponds based on the extracted geometric information for the anatomical structure.

In some embodiments, the method may further comprise processing the refined model to obtain geometric information for the anatomical structure.

In some embodiments, the anatomical structure may be a heart or a mitral valve of the heart. In some embodiments, the feature may be a trigone, an anterior part of an annulus, or a posterior part of an annulus.

According to a second aspect of the invention, there is provided a computer program product comprising a computer readable medium, the computer readable medium having computer readable code embodied therein, the computer readable code being configured such that, on execution by a suitable computer or processor, the computer or processor is caused to perform the method or the methods described above.

According to a third aspect of the invention, there is provided an apparatus for refining a model of an anatomical structure in an image, the apparatus comprising a processor. The processor is configured to acquire a model for the anatomical structure in the image, the model comprising a plurality of control points, each control point corresponding to a feature in the anatomical structure. The processor is also configured to place the model in the image with respect to the anatomical structure and, based on a user input received to adjust the model in the image, adjust a position of at least one of the plurality of control points to alter a shape of the model to the anatomical structure in the image, wherein adjustment of the position of one or more of the at least one control points is restricted based on information relating to the at least one control point. In some embodiments, the information relating to the at least one control point may comprise anatomical context information comprised in the model relating to the feature to which the at least one control point corresponds. In some embodiments, the anatomical context information may set one or more restrictions on the adjustment to the at least one control point that ensure the shape of the anatomical feature to which the at least one control point corresponds is reflected in the adjusted model.

In some embodiments, the processor may be configured to control one or more user interfaces to render the refined model of the anatomical structure.

There is thus provided an improved method and apparatus that refines a model of an anatomical structure in an image and which overcomes the existing problems.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE PREFERRED EMBODIMENTS

As noted above, the invention provides an improved method and apparatus that refines a model of an anatomical structure in an image and which overcomes the existing problems.

Figure 1:
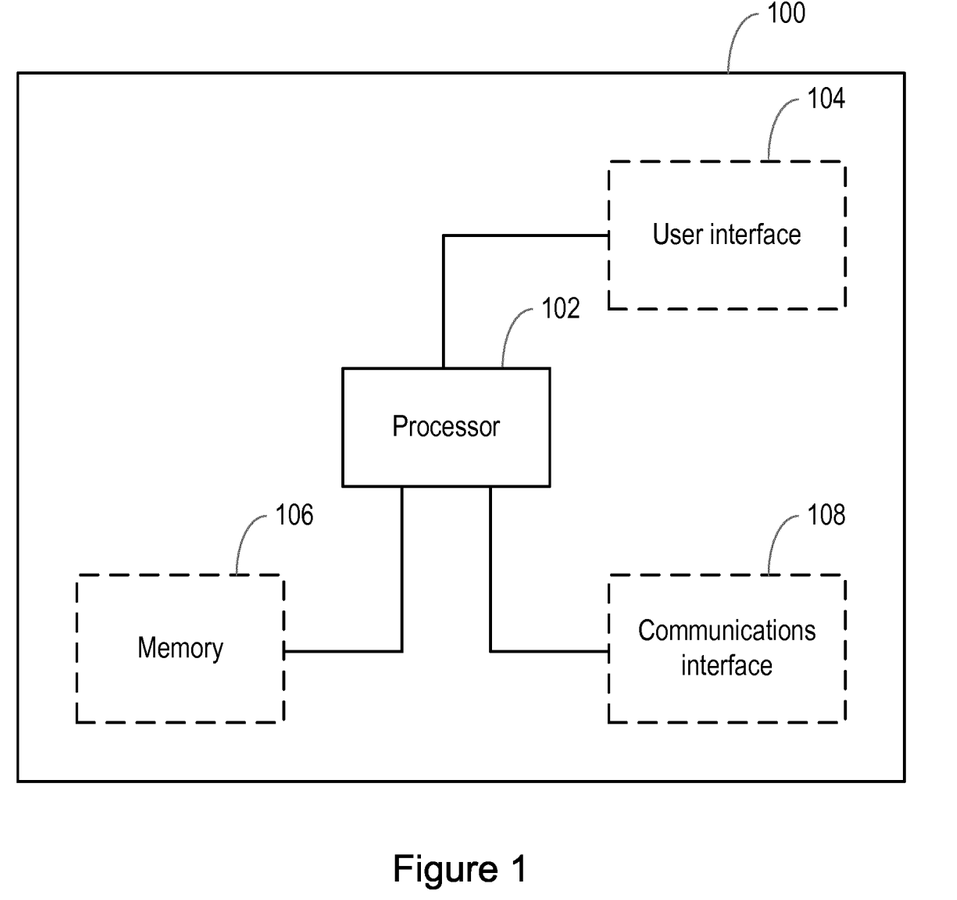
FIG. 1 is a block diagram of an apparatus according to an embodiment.

FIG. 1 shows a block diagram of an apparatus 100 according to an embodiment of the invention that can be used for refining a model of an anatomical structure in an image. The image may be a two-dimensional (2D) image or a three-dimensional (3D) image. The image can be a medical image such as a computed tomography (CT) image, a magnetic resonance (MR) image, an ultrasound (US) image, an X-ray image, a positron emission tomography (PET) image, a single photon emission computed tomography (SPECT) image, a nuclear medicine image, or any other medical image.

The anatomical structure in the image may be a heart (or part of the heart such as a mitral valve of the heart), a lung, an intestine, a kidney, a liver, or any other anatomical structure. Although examples have been provided for the anatomical structure in the image, it will be understood that the invention may also be used for refining models of other anatomical structures.

The apparatus 100 comprises a processor 102 that controls the operation of the apparatus 100 and that can implement the method describe herein. The processor 102 can comprise one or more processors, processing units, multi-core processors or modules that are configured or programmed to control the apparatus 100 in the manner described herein. In particular implementations, the processor 102 can comprise a plurality of software and/or hardware modules that are each configured to perform, or are for performing, individual or multiple steps of the method according to embodiments of the invention.

Briefly, the processor 102 is configured to acquire a model for the anatomical structure in the image and place the model in the image with respect to the anatomical structure. The model comprises a plurality of control points and each control point corresponds to a feature (or landmark) in the anatomical structure. For example, in the embodiment in which the anatomical structure in the image is the heart or a mitral valve of the heart, the feature can be a trigone (such as a left trigone or a right trigone), an anterior part of an annulus, a posterior part of an annulus, a border between segments (for example, the border between mitral valve scallops such as the border between P1 and P2 mitral valve scallops, or between any other segments) or any other feature (or landmark) in the heart or mitral valve of the heart.

In some embodiments, each control point may correspond to a different feature in the anatomical structure. For example, where one control point corresponds to the left trigone of a mitral valve, another control point may correspond to the right trigone of the mitral valve. In some embodiments, at least two control points may correspond to the same feature in the anatomical structure. Specifically, at least two control points may correspond to different locations on the same feature in the anatomical structure. For example, at least two control points may correspond to different locations on the annulus of a mitral valve. Although examples have been provided here for the anatomical structure and the feature in the anatomical structure, it will be understood that the invention may also be used for refining models of other anatomical structure with other features.

The processor 102 is also configured to adjust a position of at least one of the plurality of control points to alter a shape of the model to the anatomical structure in the image based on a user input received to adjust the model in the image. A user may, for example, be able to drag at least one control point from a first position in the image to a second position in the image. The adjustment of the position of one or more of the at least one control points is restricted based on information relating to the at least one control point. More specifically, the adjustment that the user is permitted to make to the position of one or more of the at least one control points is restricted based on information relating to the at least one control point. The restriction may, for example, be specified according to the geometry of the anatomical features represented by the control points in the model, as described in more detail below.

In some embodiments, the apparatus 100 may also comprise at least one user interface 104. Alternatively or in addition, at least one user interface 104 may be external to (i.e. separate to or remote from) the apparatus 100. For example, at least one user interface 104 may be part of another device.

A user interface 104 may be for use in providing a user of the apparatus 100 (for example, a healthcare provider, a healthcare specialist, a care giver, a subject, or any other user) with information resulting from the method according to the invention. The processor 102 may be configured to control one or more user interfaces 104 to provide information resulting from the method according to the invention. For example, the processor 102 may be configured to control one or more user interfaces 104 to render the refined model of the anatomical structure. Alternatively or in addition, a user interface 104 may be configured to receive a user input. In other words, a user interface 104 may allow a user of the apparatus 100 to manually enter instructions, data, or information. For example, the user interface may be configured to receive the user input to adjust the model in the image. The processor 102 may be configured to acquire the user input from one or more user interfaces 104.

A user interface 104 may be any user interface that enables rendering (or output) of information, data or signals to the subject or another user of the apparatus 100. Alternatively or in addition, a user interface 104 may be any user interface that enables the subject or another user of the apparatus 100 to provide a user input, interact with and/or control the apparatus 100. For example, the user interface 104 may comprise one or more switches, one or more buttons, a keypad, a keyboard, a touch screen or an application (for example on a tablet or smartphone), a display screen, a graphical user interface (GUI) or other visual indicator, one or more speakers, one or more microphones, any other voice dialogue components, one or more lights, a component for providing tactile feedback (e.g. a vibration function), or any other user interface or combination of user interfaces.

In some embodiments, the apparatus 100 may also comprise a memory 106 configured to store program code that can be executed by the processor 102 to perform the method described herein. The memory 106 can also be used to store information, data, signals and measurements acquired or made by the processor 102 of the apparatus 100 or from any interfaces, memories or devices that are external to the apparatus 100. For example, the memory 106 may be used to store the acquired model for the anatomical structure, the information relating to the at least one control point, the refined model of the anatomical structure, or similar.

In some embodiments, the apparatus 100 may also comprise a communications interface 108 for enabling the apparatus 100 to communicate with any interfaces, memories and devices that are internal or external to the apparatus 100. The communications interface 108 may communicate with any interfaces, memories and devices wirelessly or via a wired connection. For example, in the embodiment where the user interface 104 is external to the apparatus 100, the communications interface 108 may communicate with the external user interface wirelessly or via a wired connection.

It will be appreciated that FIG. 1 only shows the components required to illustrate this aspect of the invention, and in a practical implementation the apparatus 100 may comprise additional components to those shown. For example, the apparatus 100 may comprise a battery or other power supply for powering the apparatus 100 or means for connecting the apparatus 100 to a mains power supply.

Figure 2:
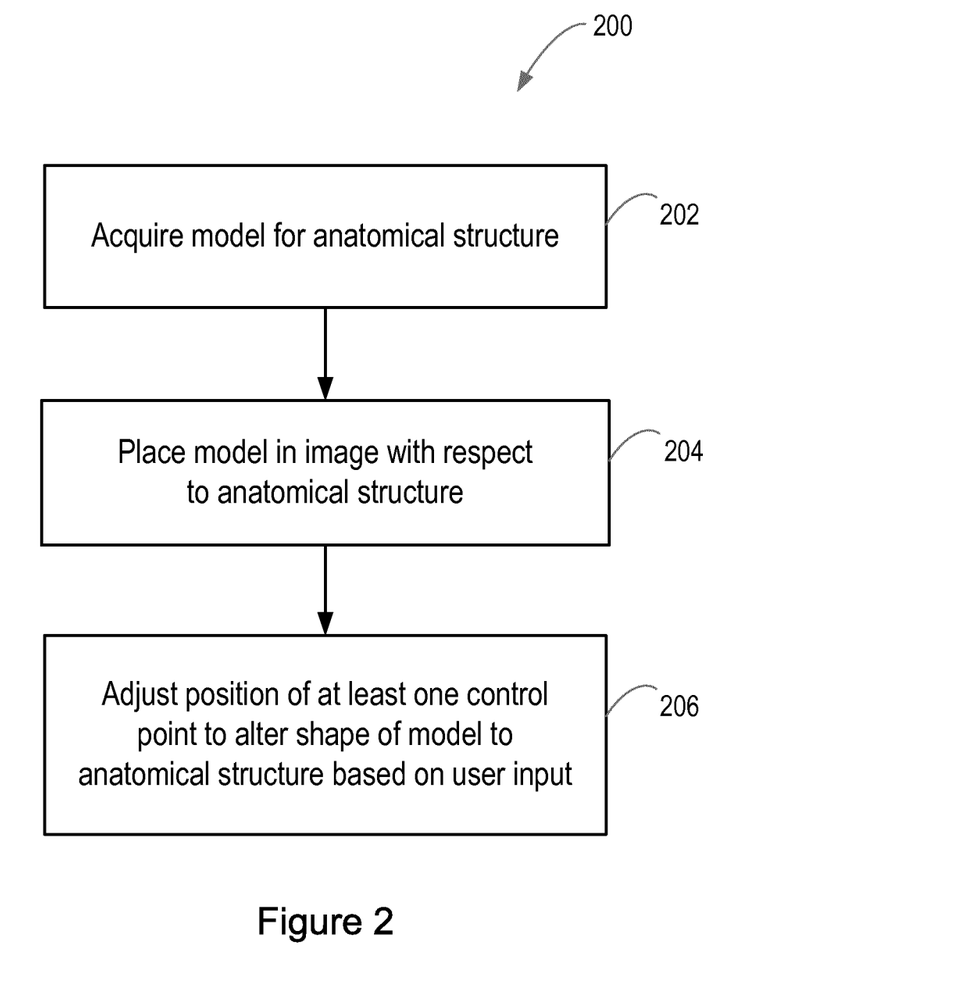
FIG. 2 is a flow chart illustrating a method according to an embodiment.

FIG. 2 illustrates a method 200 for refining a model of an anatomical structure in an image according to an embodiment. The illustrated method 200 can generally be performed by or under the control of the processor 102 of the apparatus 100.

With reference to FIG. 2, at block 202, a model for the anatomical structure in the image is acquired. The model for the anatomical structure may be acquired from the memory 106 of the apparatus 100 or from an external memory. In the two-dimensional image embodiment, the model for the anatomical structure is a two-dimensional model. In the three-dimensional image embodiment, the model for the anatomical structure is a three-dimensional model. As described earlier, the model comprises a plurality of control points and each control point corresponds to a feature (or landmark) in the anatomical structure.

At block 204, the model is placed in the image with respect to the anatomical structure. In some embodiments, placing the model in the image with respect to the anatomical structure may comprise detecting the anatomical structure in the image to place the model at the location of the anatomical structure in the image. In the heart embodiment, this can comprise detecting the heart or a part of the heart (such as the mitral valve) in the image. The anatomical structure may be detected in the image using any suitable feature extraction technique (such as the Hough transform).

In some embodiments, placing the model in the image with respect to the anatomical structure may include adaptation of the model. For example, placing the model in the image with respect to the anatomical structure may comprise a refined segmentation of the anatomical structure in the image. This can be performed using any suitable model-based segmentation technique. For example, a mesh (such as a triangulated surface mesh) of the anatomical structure may be adapted to the image. In the heart embodiment, this can comprise adapting a mesh of the heart (which can include the mitral annulus, the mitral leaflets and/or other features of the heart) to the image. The segmentation of the anatomical structure in the image may be performed automatically.

Then, geometric information may be extracted from the image (specifically, the mesh in the image) for the anatomical structure. The extracted geometric information can be adapted to the image. For example, the extracted geometric information can be used to label the features of the anatomical structure. In an exemplary embodiment, one or more subsets of mesh triangles (or vertices) can be labelled and the labelled triangles (or vertices) can be used to define the features of the anatomical structure. For example, the features of the anatomical structure may be defined by a geometric average of triangle centres (or of vertices). In the heart embodiment, an annulus can be extracted as a series of mesh edges. Although examples have been provided for the extraction of geometric information, it will be understood that geometric information can be extracted using any suitable extraction strategy.

Alternatively or in addition to an extraction based on mesh geometry and labels, dedicated local post-processing can be performed in certain regions of the image. For example, in the heart embodiment, this can comprise detecting via post-processing the location on the leaflets at which the A1 scallop and A2 scallop meet or the A2 scallop and A3 scallop meet, or detecting the location of commissure points. The post-processing may involve analysing a local image area around the segmented leaflets and analysing local grey value profiles or similar.

In some embodiments, the geometric information extracted from the image (specifically, the mesh in the image) for the anatomical structure may be transferred onto the anatomical structure in the image. For example, labels that are attached to mesh triangles (or vertices) can be projected onto the anatomical structure, or a closest control point can be determined and the label attached to that closest control point. In this way, at least one control point can be labelled with the feature (or landmark) to which the at least one control point corresponds based on the extracted geometric information for the anatomical structure. The at least one control point is adjustable by a user input to modify the shape of the model in the image.

Once the model is placed in the image with respect to the anatomical structure, the image and model can be rendered to the user. For example, the processor 102 may control one or more user interfaces 104 (such as a display screen or a graphical user interface) to render the image and model. In this way, a user can view the model in the image to provide a user input to adjust the model in the image.

In some embodiments, the model of the anatomical structure in the image can be rendered in a paddle-wheel format.

For example, views of the model of the anatomical structure can be extracted when adapted to the anatomical structure of a subject. In the heart embodiment, one or more cardiac views may be defined (such as 2 chamber views, 4 chamber views, or similar) from a set of cardiac features (such as the LV apex, the mitral, aortic valve, or any other cardiac features).

In some embodiments, the model may be rendered in a manner that provides visual feedback (or guidance) to a user during adjustment of the model such as to ensure smooth adjustments. The visual feedback can be independent of a control point that is adjusted by the user. For example, the visual feedback may be displayed as an interpolated contour of the anatomical structure that is derived from one or more other control points. In this way, the user is provided with feedback on the extent to which the adjustments will deviate from an otherwise smooth contour.

Figure 3:
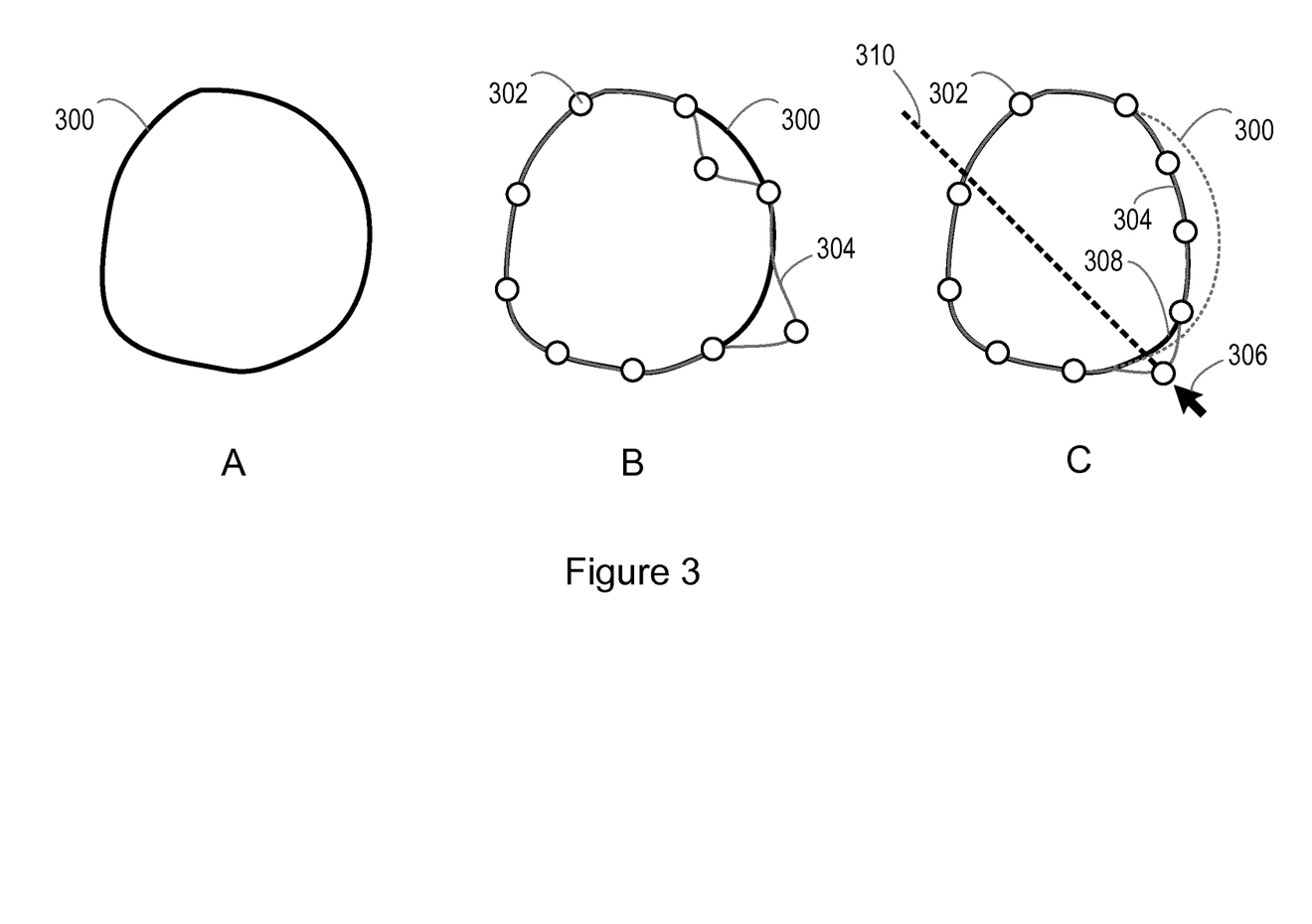
FIG. 3 is an illustration of an adjustable model according to an embodiment.

FIG. 3 illustrates an example of visual feedback rendered during adjustment of a model according to an exemplary embodiment. In this exemplary embodiment, FIG. 3A illustrates an initial contour 300, FIG. 3B illustrates a plurality of control points 302 of which some are adjusted by a user without visual feedback to adjust the initial contour 300 to arrive at an adjusted contour 304, and FIG. 3C illustrates the plurality of control points 302 adjusted by a user with visual feedback to adjust the initial contour 300 to arrive at an adjusted contour 304.

As illustrated in FIG. 3C, while the user is adjusting the control point indicated by the arrow 306, the resulting contour 308 is shown by interpolating through the other control points. In other words, the resulting contour 308 that is shown to the user is an interpolation based on the current (adjusted) control points excluding the control point being adjusted. In this way, the user can be provided with guidance for a smooth adjustment. After adjusting one or more sequential control points, the adjusted contour 304 may deviate from the initial contour 300. The exemplary embodiment illustrates an annulus as seen from the top, whereas a paddle-wheel format for control point adjustment presents an orthogonal intersection 310. In the orthogonal intersection 310, only one control point is seen from the annulus. The visual feedback provided to the user may include display of the orthogonal intersection 310 with the resulting contour 308.

Returning again to FIG. 2, at block 206, based on a user input received to adjust the model in the image, a position of at least one of the plurality of control points is adjusted to alter a shape of the model to the anatomical structure in the image. The adjustment of the position of the at least one control point may cause adjustment of a position of one or more other control points. In one embodiment, adjustment of a control point (such as a control point at the centre of the anatomical structure) may cause movement of the entire model.

The adjustment of the position of one or more of the at least one control points is restricted based on information relating to the at least one control point. The adjustment of the position of one or more of the at least one control points is restricted during the adjustment itself. In some embodiments a position of at least two of the plurality of control points may be adjusted to alter the shape of the model to the anatomical structure in the image. In this embodiment, the position of one of the at least two control points may be restricted independently of one or more other control points. In other words, the restriction placed on the adjustment of two or more of the plurality of control points may be different.

In some embodiments, the information relating to the at least one control point may comprise anatomical context information, which is comprised (or encoded) in the model. For example, typical adjustment parameters may be encoded in the model and, in this way, also in the anatomical structure. In an exemplary embodiment, the model may encode additional information on adjustment parameters for certain triangles or vertices (or for certain groups of triangles or vertices) and this information can be transferred to the control points as anatomical context information. The anatomical context information relates to the feature to which the at least one control point corresponds.

The anatomical context information may define a manner in which a shape of the feature to which the at least one control point corresponds is constructed from adjusting the at least one control point. Specifically, the anatomical context information may set one or more restrictions on an adjustment that can be made to the at least one control point to ensure that the shape of the anatomical feature to which the at least one control point corresponds is reflected in the resulting model. For example, the one or more restrictions can limit the adjustment that can be made (or that are permitted) to the at least one control point to adjustments that are typical or expected for the anatomical feature to which the at least one control point corresponds. In some embodiments, the anatomical context information may restrict the adjustments that can be made according to the amount of geometric variation observed in the corresponding feature in real humans. In some embodiments, the one or more restrictions include an amount (or a maximum amount) by which the at least one control point can be adjusted to ensure that the shape of the feature to which the at least one control point corresponds is reflected in the resulting model. The amount (or the maximum amount) by which the at least one control point can be adjusted may be set to an amount that is typical or expected for the feature to which the at least one control point corresponds. The one or more restrictions may be encoded into the model. For example, the amount of adjustment may be encoded into the model and a maximum limit set for this. A notification may then be provided if a user input to adjust the model goes beyond the maximum limit.

In some embodiments, alternatively or in addition to anatomical context information, the information relating to the at least one control point may comprise image context information. The image context information relates to one or more characteristics of the image at the at least one control point. In some embodiments, the method may thus comprise measuring one or more characteristics of the image. In some embodiments, a characteristic of the image at the at least one control point may be an intensity difference in a region around the at least one control point. In these embodiments, it may be encoded in the model how to determine a typical editing range from an image. For example, in regions with homogeneous grey values, a feature of the anatomical structure may be less accurately defined. A larger adjustment may thus be permitted than for a higher intensity feature, which may be more accurately defined in the image. In some embodiments, a characteristic of the image at the at least one control point may be an absolute intensity. In these embodiments, it may be encoded in the model that editing is not permitted (i.e. is prevented) in regions having an absolute intensity that exceeds a maximum value. This limit placed on editing may be encoded in the image by not permitting (i.e. preventing) placement of control points within regions having an absolute intensity that exceeds the maximum value. This may be particularly useful in some applications, such as computed tomography applications, in which calcifications appear bright in that the model can prevent placement of control points within calcified regions. In other embodiments, a characteristic of the image at the at least one control point may be a noise level, or any other characteristic, or combination of characteristics of the image.

The adjustment of the positon of the at least one control point may be restricted in any suitable manner. In some embodiments, the adjustment of the positon of the at least one control point may be restricted by restricting the degrees of freedom for the adjustment of the position of the at least one control point. Alternatively or in addition to the restriction of the degrees of freedom, the adjustment of the positon of the at least one control point may be restricted by restricting any one or more of a plane in which the position of the at least one control point is adjustable, a direction in relation to an original position of the at least one control point in which the at least one control point is adjustable, a direction in relation to at least one other control point in which the at least one control point is adjustable, a distance from the original position of the at least one control point by which the at least one control point is adjustable, a distance in relation to at least one other control point by which the at least one control point is adjustable, a region within which the control point is adjustable, a movement of the at least one control point to a curve (for example, constructed from or dependent on other control points) or a non-planar plane, or any other restriction, or combination of restrictions.

In this way, the adjustment of control points that correspond to different features in the anatomical structure can be restricted in different ways. In other words, different adjustment modes can be provided for different control points in the model (and thus different features in the anatomical structure). For example, in the heart embodiment, the central posterior part of the annulus may benefit from a different adjustment mode than a region around the trigones.

The restriction on the adjustment of the positon of the at least one control point may be constrained or relaxed depending on one or more of the anatomical context information and image context information. For example, the control points corresponding to the central posterior part of the annulus may be displaceable within the annulus plane, while the control points corresponding to a trigone may be restricted (at least in one adjustment mode) to remain on an annulus contour. In some embodiments, the control points corresponding to the trigones may be restricted to being adjustable along the annulus line only. In some embodiments, control points corresponding to the trigones may be adjustable in a combined way (for example, both in the same direction or both in opposite directions). In some embodiments, a restriction may also control whether or not control points are allowed to move perpendicular to the annulus plane. In some embodiments, the restriction on the adjustment of the positon of the at least one control point may be relaxed in regions of weak intensity differences in a region around the at least one control point.

Alternatively or in addition to the above, one or more margins of geometrical uncertainty may be encoded on the model of the anatomical structure. A margin of geometrical uncertainty can be different depending on a feature in the anatomical structure. For example, in the heart embodiment, a margin of geometrical uncertainty for the trigones may be different from the margin of geometrical uncertainty for the posterior annulus centre. In some embodiments, the one or more margins of geometrical uncertainty may be rendered with the image and the model such that the margin is viewable by a user during adjustment. Alternatively or in addition, a notification (such as a pop-up warning notification) may be output when the received user input is indicative of an adjustment that will cause a control point to be moved outside the one or more margins.

Although examples for the restriction on the adjustment of the positon of the at least one control point have been provided, it will be understood that any other restrictions or combination of restrictions can be applied to the adjustment.

Although not illustrated in FIG. 2, in some embodiments, the method may further comprise rendering the refined model of the anatomical structure. For example, as described earlier, the processor 102 may control one or more user interfaces 104 to render the refined model of the anatomical structure. In one exemplary embodiment, the refined model of the anatomical structure may be rendered on a display screen or graphical user interface.

In some embodiments, the method may further comprise processing the refined model to obtain geometric information for the anatomical structure. Alternatively or in addition to rendering the refined model of the anatomical structure, the obtained geometric information for the anatomical structure may be rendered. For example, the processor 102 may control one or more user interfaces 104 to render the obtained geometric information for the anatomical structure. In one exemplary embodiment, the obtained geometric information for the anatomical structure may be rendered on a display screen or graphical user interface. As the geometric information for the anatomical structure is obtained from a refined model of the anatomical structure, the obtained geometric information is more accurate and reliable.

There is also provided a computer program product comprising a computer readable medium, the computer readable medium having computer readable code embodied therein, the computer readable code being configured such that, on execution by a suitable computer or processor, the computer or processor is caused to perform the method described herein. Thus, it will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention.

It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

There is therefore provided an improved method and apparatus that refines a model of an anatomical structure in an image. The method and apparatus can be useful in medical imaging analysis and visualisation tools. For example, the method and apparatus is particularly useful in the treatment of mitral valve disease or any other disease involving complex anatomical structures.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for refining a model of an anatomical structure in an image, the method comprising:
   acquiring a model for the anatomical structure in the image, the model comprising a plurality of control points, each control point corresponding to a feature in the anatomical structure;
   placing the model in the image with respect to the anatomical structure; and
   based on a user interaction input received to adjust the model in the image, adjusting a position of at least one of the plurality of control points to alter a shape of the model to the anatomical structure in the image, wherein the adjustment of the position of one or more of the at least one control points is restricted based on information relating to the at least one control point,
   wherein the information relating to the at least one control point comprises anatomical context information comprised in the model relating to the anatomical feature to which the at least one control point corresponds, and wherein the anatomical context information sets one or more restrictions on the adjustment to the at least one control point that ensure the shape of the anatomical feature to which the at least one control point corresponds is reflected in the adjusted model.

2. The method as claimed in claim 1, wherein adjustment of the position of the at least one control point causes adjustment of a position of one or more other control points.

3. The method as claimed in claim 1, comprising adjusting a position of at least two of the plurality of control points to alter the shape of the model to the anatomical structure in the image, wherein adjustment of the position of one of the at least two control points is restricted independently of one or more other control points.

4. The method as claimed in claim 1, wherein the anatomical context information is encoded in the model.

5. The method as claimed in claim 1, wherein the one or more restrictions include a maximum amount by which the at least one control point is adjustable to ensure the shape of the feature to which the at least one control point corresponds is reflected in the adjusted model.

6. The method as claimed in claim 1, wherein the information relating to the at least one control point comprises image context information relating to one or more characteristics of the image at the at least one control point.

7. The method as claimed in claim 1, wherein the adjustment of the position of the at least one control point is restricted by restricting the degrees of freedom for the adjustment of the position of the at least one control point.

8. The method as claimed in claim 1, wherein the adjustment of the position of the at least one control point is restricted by restricting any one or more of the following:
   a plane in which the position of the at least one control point is adjustable;
   a direction in relation to an original position of the at least one control point in which the at least one control point is adjustable;
   a direction in relation to at least one other control point in which the at least one control point is adjustable;
   a distance from the original position of the at least one control point by which the at least one control point is adjustable;
   a distance in relation to at least one other control point by which the at least one control point is adjustable;
   a region within which the control point is adjustable; and
   a movement of the at least one control point to a curve or a non-planar plane.

9. The method as claimed in claim 1, further comprising:
   extracting geometric information from the image for the anatomical structure; and
   labelling at least one control point with the feature to which the at least one control point corresponds based on the extracted geometric information for the anatomical structure.

10. The method as claimed in claim 1, further comprising:
    processing the refined model to obtain geometric information for the anatomical structure.

11. The method as claimed in claim 1, wherein the anatomical structure is a heart or a mitral valve of the heart.

12. The method as claimed in claim 11, wherein the feature is a trigone, an anterior part of an annulus, or a posterior part of an annulus.

13. A computer program product comprising a computer readable medium, the computer readable medium having computer readable code embodied therein, the computer readable code being configured such that, on execution by a suitable computer or processor, the computer or processor is caused to:
    acquire a model for the anatomical structure in the image, the model comprising a plurality of control points, each control point corresponding to a feature in the anatomical structure;
    place the model in the image with respect to the anatomical structure; and
    adjust, based on a user interaction input received to adjust the model in the image, a position of at least one of the plurality of control points to alter a shape of the model to the anatomical structure in the image, wherein the adjustment of the position of one or more of the at least one control points is restricted based on information relating to the at least one control point,
    wherein the information relating to the at least one control point comprises anatomical context information comprised in the model relating to the anatomical feature to which the at least one control point corresponds, and wherein the anatomical context information sets one or more restrictions on the adjustment to the at least one control point that ensure the shape of the anatomical feature to which the at least one control point corresponds is reflected in the adjusted model.

14. An apparatus for refining a model of an anatomical structure in an image, the apparatus comprising:
    a processor configured to:
    acquire a model for the anatomical structure in the image, the model comprising a plurality of control points, each control point corresponding to a feature in the anatomical structure;
    place the model in the image with respect to the anatomical structure; and
    based on a user interaction input received to adjust the model in the image, adjust a position of at least one of the plurality of control points to alter a shape of the model to the anatomical structure in the image, wherein the adjustment of the position of one or more of the at least one control points is restricted based on information relating to the at least one control point,
    wherein the information relating to the at least one control point comprises anatomical context information comprised in the model relating to the anatomical feature to which the at least one control point corresponds, and wherein the anatomical context information sets one or more restrictions on the adjustment to the at least one control point that ensure the shape of the anatomical feature to which the at least one control point corresponds is reflected in the adjusted model.

15. The apparatus as claimed in claim 14, wherein the processor is configured to control one or more user interfaces to render the refined model of the anatomical structure.

16. The method as claimed in claim 11, wherein a first control point of the plurality of control points corresponds to a first anatomical feature of the heart or mitral valve and a second control point of the plurality of control points corresponds to a second anatomical feature of the heart or mitral valve.

17. The method as claimed in claim 16, wherein the first and second anatomical features are each from a feature from a group consisting of: a trigone, an anterior or posterior part of an annulus, and a border between segments.

18. The method as claimed in claim 1, wherein the plurality of control points are on an anatomical contour, and adjusting the position of at least one of the plurality of control points includes moving the at least one of the plurality of control points from a first position to a second different position, which adjusts a shape of the anatomical contour.

19. The method as claimed in claim 18, wherein the position of the at least one of the plurality of control points is adjusted without visual feedback.

20. The method as claimed in claim 19, wherein the position is adjusted with visual feedback.

* * * * *